(12) United States Patent
Vallabhu

(10) Patent No.: US 9,668,216 B2
(45) Date of Patent: May 30, 2017

(54) TECHNIQUES FOR DEVICE POWER MANAGEMENT IN A LOCAL WIRELESS NETWORK

(71) Applicant: Intel Corporation, Santa Clara, CA (US)

(72) Inventor: Venkata Vallabhu, Aloha, OR (US)

(73) Assignee: INTEL CORPORATION, Santa Clara, CA (US)

( * ) Notice: Subject to any disclaimer, the term of this patent is extended or adjusted under 35 U.S.C. 154(b) by 196 days.

(21) Appl. No.: 14/129,943

(22) PCT Filed: Sep. 12, 2013

(86) PCT No.: PCT/US2013/059435
§ 371 (c)(1),
(2) Date: Dec. 28, 2013

(87) PCT Pub. No.: WO2015/038126
PCT Pub. Date: Mar. 19, 2015

(65) Prior Publication Data
US 2015/0071141 A1    Mar. 12, 2015

(51) Int. Cl.
*H04W 52/02* (2009.01)
*H04W 76/02* (2009.01)

(52) U.S. Cl.
CPC ... *H04W 52/0229* (2013.01); *H04W 52/0216* (2013.01); *H04W 76/023* (2013.01)

(58) Field of Classification Search
None
See application file for complete search history.

(56) References Cited

U.S. PATENT DOCUMENTS

| 7,443,824 | B1 | 10/2008 | Lipford et al. |
| 7,545,762 | B1* | 6/2009 | McConnell ......... H04L 12/2602 370/310.2 |
| 8,254,910 | B1 | 8/2012 | Breau et al. |
| 2005/0138377 | A1 | 6/2005 | First et al. |
| 2006/0030338 | A1 | 2/2006 | Harken et al. |
| 2007/0242645 | A1* | 10/2007 | Stephenson ....... H04W 52/0216 370/338 |
| 2007/0263574 | A1* | 11/2007 | Lu ..................... H04W 52/0261 370/338 |

(Continued)

OTHER PUBLICATIONS

Wi-Fi Alliance Hotspot 2.0 (Release 2) Technical Specification—Version 3.08, Wi-Fi Alliance (2013), author unknown, 200 pages.

(Continued)

*Primary Examiner* — Hassan Phillips
*Assistant Examiner* — Duc Duong

(57) ABSTRACT

Techniques for device power management for wireless local networks are described. An apparatus may comprise a network access component for execution by circuitry to automatically determine whether a wireless device can access a wireless network based on security credentials of the wireless device, and generate a network status signal when the wireless device can access a wireless network. The apparatus may comprise a power interface component for execution by circuitry to send control directives to manage various power states of the wireless device based on the network status signal. Other embodiments are described and claimed.

21 Claims, 11 Drawing Sheets

(56) References Cited

U.S. PATENT DOCUMENTS

| | | | | |
|---|---|---|---|---|
| 2012/0052873 | A1* | 3/2012 | Wong | H04W 52/0251 455/456.1 |
| 2012/0076117 | A1* | 3/2012 | Montemurro | H04W 48/16 370/338 |
| 2012/0201143 | A1 | 8/2012 | Schmidt et al. | |
| 2012/0281609 | A1 | 11/2012 | Kasslin et al. | |
| 2013/0007853 | A1* | 1/2013 | Gupta | H04W 12/06 726/5 |
| 2013/0094521 | A1* | 4/2013 | Mao | H04L 61/305 370/476 |
| 2013/0223308 | A1* | 8/2013 | Chandra | H04W 52/0229 370/311 |
| 2014/0018037 | A1 | 1/2014 | Shanmugavadivel et al. | |
| 2014/0023059 | A1 | 1/2014 | Gupta | |
| 2014/0092805 | A1 | 4/2014 | van de Ven et al. | |
| 2014/0185597 | A1* | 7/2014 | Gupta | H04L 63/0823 370/338 |
| 2014/0199968 | A1* | 7/2014 | Canpolat | H04W 48/20 455/411 |
| 2014/0233406 | A1* | 8/2014 | Chhabra | H04W 48/14 370/252 |
| 2015/0078359 | A1* | 3/2015 | Scahill | H04W 48/16 370/338 |

OTHER PUBLICATIONS

Office Action received for U.S. Appl. No. 13/867,099, mailed Jan. 30, 2015, 11 pages.
Office Action received for U.S. Appl. No. 13/867,099, mailed Aug. 12, 2015, 13 pages.
International Search Report and Written Opinion received for PCT Patent Application No. PCT/US2013/059435, mailed Jun. 26, 2014, 14 pages.
Schumacher et al., "WLAN Traffic Offload in LTE", White Paper, Rhode & Schwarz, Nov. 21, 2012, 32 pages.

* cited by examiner

*1000*

```
SEND AN ACCESS NETWORK QUERY PROTOCOL
(ANQP) NETWORK ACCESS IDENTIFIER (NAI) HOME
REALM QUERY MESSAGE TO A ACCESS POINT FOR A
WIRELESS LOCAL AREA NETWORK (WIRELESS
NETWORK) OVER A WIRELESS CONNECTION, THE
ANQP NAI HOME REALM QUERY MESSAGE TO
INCLUDE A NAI HOME REALM NAME FOR WHICH A
MOBILE DEVICE HAS SECURITY CREDENTIALS
1002
```

```
RECEIVE AN ANQP NAI HOME REALM RESPONSE FROM
THE ACCESS POINT OVER THE WIRELESS
CONNECTION, THE ANQP NAI HOME REALM RESPONSE
TO INCLUDE A REALM LIST WITH A NAI HOME REALM
NAME FOR WHICH THE ACCESS POINT PROVIDES
ACCESS
1004
```

```
DETERMINE WHETHER THE NAI HOME REALM NAME
FOR THE MOBILE DEVICE MATCHES THE NAI HOME
REALM NAME FOR THE ACCESS POINT
1006
```

```
PERFORM POWER MANAGEMENT OPERATIONS FOR
THE MOBILE DEVICE BASED ON MATCHING NAI HOME
REALM NAMES
1008
```

*FIG. 10*

TECHNIQUES FOR DEVICE POWER MANAGEMENT IN A LOCAL WIRELESS NETWORK

TECHNICAL FIELD

Embodiments described herein generally relate to improving power management for a mobile device based on network accessibility.

BACKGROUND

Communications infrastructure for wireless local area networks (WLAN), such as those operating under the Institute of Electrical and Electronics Engineers (IEEE) 802.11 series of standards (collectively referred to as "Wi-Fi"), continues to evolve to meet changing user needs. Wi-Fi networks are becoming increasingly prevalent due to low-cost infrastructure and high-bandwidth availability. This phenomenon is leading to the emergence of large numbers of Wi-Fi "hotspots," which are localized wireless networks operating as gateways into a larger wired network such as the Internet. In general, an association process for a user to find and connect to a correct Wi-Fi network may require excessive time and complications for most users. The rapid growth of Wi-Fi hotspots exacerbates this problem. The extensive procedures required for association procedures may cause excessive user frustration and generally deter users from accessing Wi-Fi networks. Furthermore, the proliferation of Wi-Fi hotspots and corresponding increase in association procedures consumes significant device resources, such as compute, memory and power resources.

BRIEF DESCRIPTION OF THE DRAWINGS

FIG. 10 illustrates an embodiment of a third logic flow.

DETAILED DESCRIPTION

Figure 1:
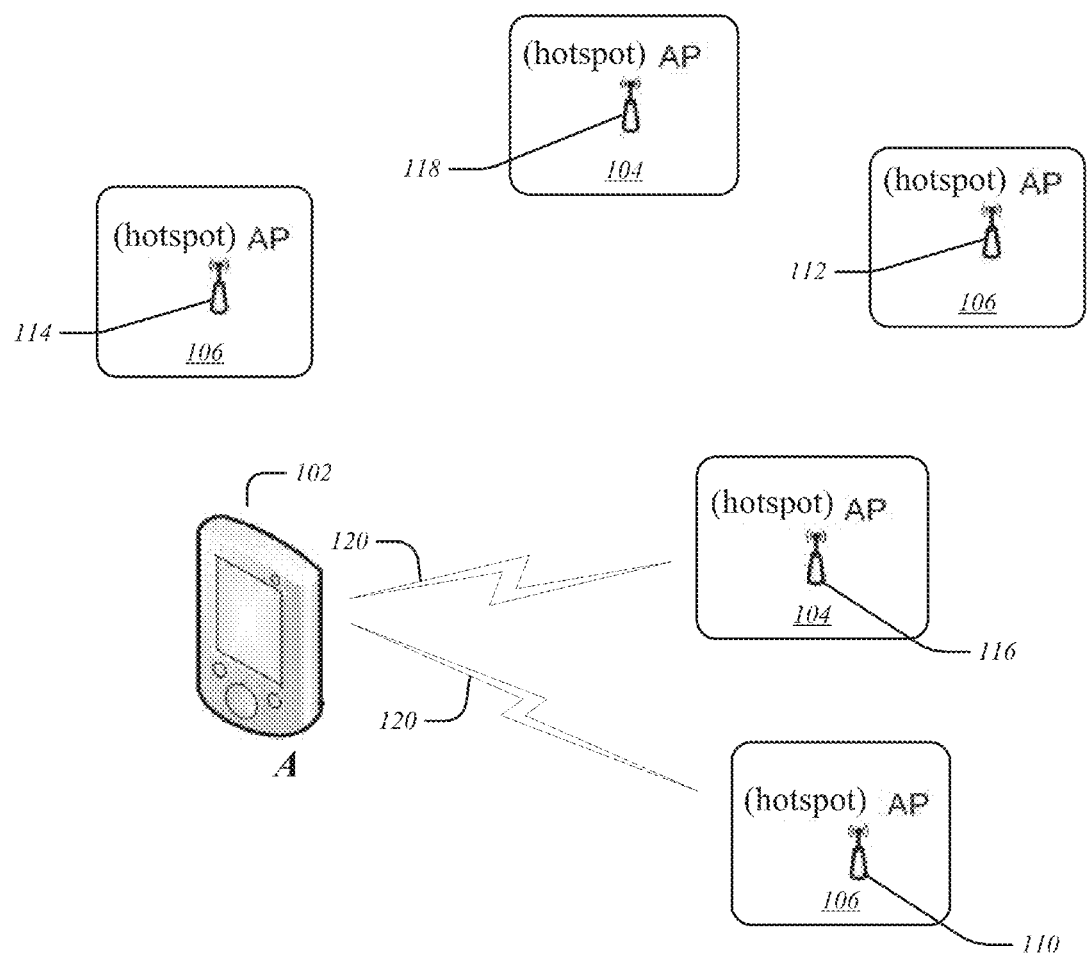
FIG. 1 illustrates an embodiment of a communications arrangement.

Embodiments provide novel power management for a mobile device based on improved network accessibility. Embodiments utilize networking mechanisms that facilitate a fast and efficient process for identifying which Wi-Fi networks a wireless device is permitted to access with the user or device credentials. This generally reduces or removes manual operations currently needed for determining which, if any, wireless networks a user can access. The networking mechanisms enable a mobile device to automatically identify available wireless networks including those of a home service provider and visiting networks. This automatic identification allows the mobile device to efficiently manage power states for various components based on identification of available wireless networks. As a result, embodiments provide enhanced Wi-Fi network connection capability, power saving techniques, and user experience. Other advantages exist as well.

Communications infrastructure for wireless networks, such as a Wi-Fi network, continues to evolve to meet changing user needs. In general, an association process for a user to find and connect to a correct Wi-Fi network may require excessive time and complications for most users. Recent efforts to address some of these issues have led to development of a series of standards to simplify connection and roaming in Wi-Fi based networks. One such standard includes a Wi-Fi Alliance® Technical Committee Hotspot 2.0 Technical Task Group Hotspot 2.0 (Release 2) Technical Specification, Version 2.04, dated Jan. 2, 2013 ("Hotspot 2.0 Standard"), along with its variants, modifications and progeny. The Hotspot 2.0 Standard represents an evolution of Wi-Fi infrastructure and is designed to interoperate with various IEEE 802.11 standards for wireless network communications. Some goals of the Hotspot 2.0 standards include enabling simple, secure connection to Wi-Fi hotspots, facilitating easy roaming among them, and managing traffic offload from 3G/4G networks to Hotspot 2.0-enabled Wi-Fi networks. As part of this effort, network operators are presently deploying a large number of Wi-Fi hotspots to address the growing data demand, provide better quality of experience, and reduce churn.

One of the fundamental remaining challenges facing users of Wi-Fi capable devices in public hotspots is the ability to discover which Wi-Fi hotspot is available for users/devices to access based upon the credentials possessed by a given user. In the absence of any standards, this process involves a multiple step trial and error method. Among the various actions that may be performed before a user successfully accesses a given public hot-spot, the user of a wireless device may be required to find and launch a "Connection Manager" program or application resident on the wireless device. Subsequently, the wireless device may scan for publicly available wireless networks, which may be displayed on the wireless device to the user as a service set identifier (SSID). A SSID typically represents a public name for a given network. The user may then manually select a SSID to connect to a corresponding wireless network hotspot. The wireless device may then perform an association process with the selected hotspot (wireless access point of the wireless network). Subsequently, in typical scenarios, the user may manually launch a web browser application, which triggers the hotspot to launch a web page on the user's wireless device that redirects the session and displays provider information and/or roaming partner information. At this point, a determination is typically made as to whether the wireless device user has the proper credentials to access the provider of the hotspot or whether network roaming is supported. If so, access to the public hotspot may be permitted following one or more additional actions, such as the user providing specific information indicating credentials, such as providing codes, selecting menu items provided in the web browser, and so forth.

Conventional solutions attempt to solve the association problem by saving a list of SSIDs for all networks to which a user or device may gain access. The device may then compare a detected SSID with the list of SSIDs to find a match. However, the proliferation of hotspots means that the list of network SSIDs becomes increasingly long, with potentially millions of SSIDs, thereby requiring significant amounts of memory for a device. Furthermore, the matching process becomes longer as the list of network SSIDs increases, which in turn increases latency in detecting and associating with an accessible wireless network. This decreases performance, consumes on-device memory that may be used for other applications, and increases the expense of the device.

As is apparent, the above process is both extensive and may entail needless complication and time. Although this process to obtain Wi-Fi hotspot access may be familiar to many users, the extensive procedures required and the potential for making errors during such procedures may cause excessive user frustration and generally deter users from accessing Wi-Fi networks.

Furthermore, a mobile device often needs to be switched from lower power states to higher power states in order to detect and associate with new networks, some of which may not be accessible to the mobile device, thereby unnecessarily consuming device power. It is with respect to these and other considerations that the present improvements have been needed.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will be apparent from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1. Illustrates one embodiment of a communications arrangement 100. The communications arrangement 100 includes a wireless network 104 and a wireless network 106. Within each wireless network 104 and wireless network 106, multiple wireless communications points are deployed such as the access points (AP) as shown in FIG. 1. Unless otherwise noted, as used herein, the term "access point" and "hotspot" are used interchangeably to refer to a fixed or mobile wireless network device that provides access or entry to a network.

Also illustrated in FIG. 1 is a wireless device 102 capable of communicating with one or both wireless networks 104, 106. Examples of wireless device 102 may include a variety of types of computing device with wireless capabilities, including without limitation, a desktop computer system, a data entry terminal, a laptop computer, a netbook computer, a tablet computer, an Ultrabook™, a handheld personal data assistant, a smartphone, a digital camera, a body-worn computing device incorporated into clothing, a computing device integrated into a vehicle (e.g., a car, a bicycle, a wheelchair, etc.), a server, a cluster of servers, a server farm, a station, a wireless station, user equipment, consumer electronic devices, digital television device, videogame device, or other electronic computing device or communications device. In one embodiment, for instance, the wireless device 102 may comprise a mobile device having a mobile power source, such as a battery. Embodiments are not limited in this context.

In various embodiments, the wireless device 102 and/or the wireless networks 104, 106 may communicate in accordance with one or more wireless communications standards. In one embodiment, for example, a communication standard may include a wireless communications standard from the IEEE 802.11 family of standards, such as IEEE 802.11a, 802.11b, 802.11g, 802.11n, 802.11-2012, 802.11ac, 802.11ad, 802.11u, and so forth (collectively referred to as "Wi-Fi Standards"). In one embodiment, for example, a communication standard may comprise a particular Wi-Fi Standard, such as the IEEE 802.11u standard titled "Part 11: Wireless LAN Medium Access Control (MAC) and Physical Layer (PHY) Specifications, Amendment 9: Interworking with External Networks," dated Feb. 25, 2011 ("IEEE 802.11u Standard"), along with its variants, modifications and progeny. In one embodiment, for example, a communication standard may include the Hotspot 2.0 Standard. These are merely a few examples of communications standards, and others may be implemented as well. Embodiments are not limited in this context.

As the wireless device 102 moves between locations, wireless communications may be established and/or broken between the wireless device 102 and one or more communications points within the wireless network 104 and wireless network 106. In conventional operation, the wireless device 102 may be set to scan for available networks to establish a communications link. This scanning may take place according to a predetermined procedure, whether the wireless device 102 is stationary or moving between locations. Under conventional operation, the wireless device 102 may attempt to associate with one or more access points 110-118 as the wireless device 102 enters within communications range of a respective access point. However, in conventional operation, before the wireless device 102 becomes associated with any of the given wireless access points 110-118, various manual operations need to be performed, requiring excessive and burdensome user intervention for the user of wireless device 102, as previously discussed.

However, in the present embodiments, mechanisms are provided that facilitate network discovery and selection for the wireless device 102 via an access point such as access points 110-118 without excessive user intervention, provided the wireless device 102 exhibits the appropriate credentials as detailed below. In various embodiments, network selection may be initiated with the aid of a generic advertisement service (GAS) mechanism, which provides for discovery of suitable networks (pre-association) through the advertisement of access network type (e.g., private network, free public network, for-fee public network), roaming consortium, and venue information. For example, the wireless device 102 may send an access network query protocol (ANQP) information element, as defined by the IEEE 802.11u Standard, to identify home service providers of wireless device 102 that is contained within a GAS message. An example of a GAS message may include a GAS initial request frame. The GAS initial request frame may be relayed by one or more of the access points 110-118 to a respective server for the network associated with the access point. In addition, the access point may deliver the server response back to the wireless device 102.

In the example of FIG. 1, when the wireless device 102 is located at position A the wireless device 102 may send a message such as a GAS message 120, which is received by two access points in close proximity to the wireless device 102, such as access points 110, 116. In one exemplary implementation, the access point 116 may be part of a network 104 of a first service provider, while the access point 110 is part of the network 106 of a second service provider. Consistent with the present embodiments, and detailed below with respect to FIG. 4, in one specific scenario the first service provider of network 104 may determine from the GAS message 120 that the home service provider of (the user of) wireless device 102 is to be permitted network access via the AP (hotspot) 116, while the second service provider of network 106 may determine from the GAS message 120 that the home service provider of (the user of) wireless device 102 is not to be permitted network access via the AP (hotspot) 110. Accordingly, the wireless device 102 may receive response messages from each of AP 110, 116, which apprises the wireless device 102 that association may (only) take place via AP 116. The wireless device 102 may consequently perform the appropriate tasks to determine association depending on a set protocol; for example, the wireless device 102 may then continue to complete an association process so that linking to the network 104 is completed.

Figure 2:
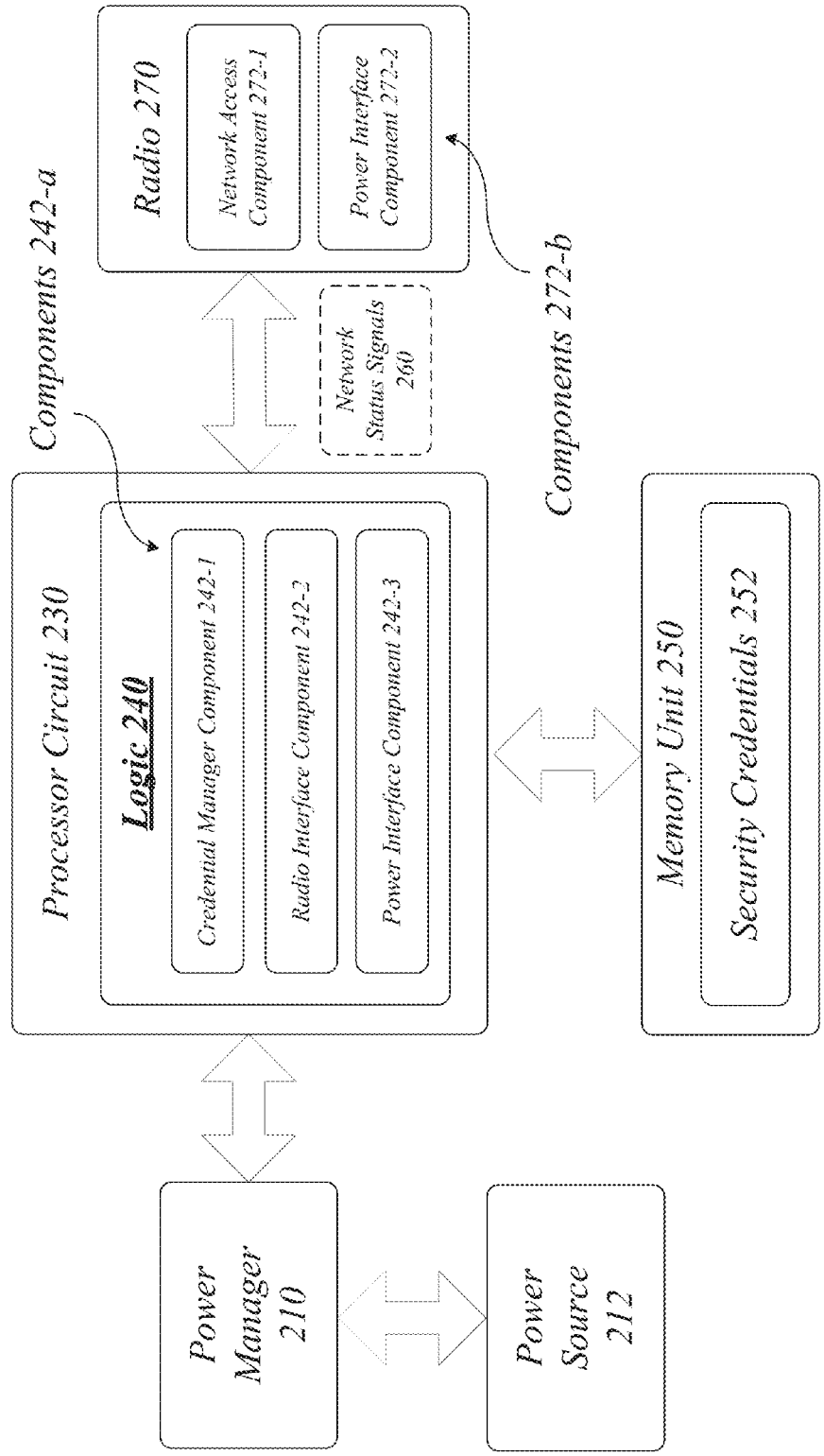
FIG. 2 illustrates an embodiment of a wireless device.

FIG. 2 illustrates an exemplary block diagram for a wireless device 102. As shown in FIG. 2, the wireless device 102 may comprise a power manager 210, a power source 212, a processor circuit 230, a memory unit 250 and a radio 270. Although the wireless device 102 shown in FIG. 2 has a limited number of elements in a certain topology, it may be appreciated that the wireless device 102 may include more or less elements in alternate topologies as desired for a given implementation.

The wireless device 102 may comprise a power manager 210. The power manager 210 may be generally arranged to manage one or more power states for one or more parts of the wireless device 102. More particularly, the power manager 210 may manage two or more power states of the processor circuit 230 of the wireless device 102 based on one or more control directives received from the power interface component 242-3 of the logic 240 and/or the power interface component 272-2 of the radio 270. Examples of power states for the wireless device 102 may be described with reference to FIG. 3.

In one embodiment, the power manager 210 may manage power in accordance with a power management standard or specification, such as the Advanced Configuration and Power Interface (ACPI) specification, for example. The ACPI specification provides an open standard for device configuration and power management by the operating system. When an electronic device is not being fully utilized by a user, power management techniques such as ACPI may be used to place the electronic device in various power states (or performance states), with each power state reducing or eliminating an amount of power provided by the power source 212 to various components of the electronic device to reduce overall power consumption for the electronic device. The ACPI specification is merely one example of power management suitable for the wireless device 102, and others may be implemented as well. The embodiments are not limited in this context.

The wireless device 102 may comprise a power source 212 coupled to the power manager 210. The power source 212 may be generally arranged to provide power to some or all components of the wireless device 102. In one embodiment, the power source 212 may comprise a portable power source, such as a battery, for example. In one embodiment, the power source 212 may comprise a non-portable power source, such as an AC main power supply. The embodiments are not limited in this context.

The wireless device 102 may comprise a processor circuit 230 coupled to the power manager 210. The processor circuit 230 may be generally arranged to execute logic for the wireless device 102, such as logic 240, for example. Examples for the processor circuit 230 may include any of a wide variety of commercially available processors. Further, one or more of these processor components may include multiple processors, a multi-threaded processor, a multi-core processor (whether the multiple cores coexist on the same or separate dies), and/or a multi-processor architecture of some other variety by which multiple physically separate processors are in some way linked. The embodiments are not limited in this context.

The processor circuit 230 may comprise or implement logic 240. The logic 240 may be generally arranged to perform a set of logical operations designed to produce a specific result. In one embodiment, for example, the logic 240 may control operations needed for management of security credentials to access a device or network, management of radio operations, and management of power states, among other operations. The logic 240 may be implemented in hardware, software, or a combination of hardware and software. In one embodiment, for example, logic 240 may be implemented as one or more software applications comprising one or more components 242-*a*.

It is worthy to note that "a" and "b" and "c" and similar designators as used herein are intended to be variables representing any positive integer. Thus, for example, if an implementation sets a value for a=5, then a complete set of components 242-*a* may include components 242-1, 242-2, 242-3, 242-4 and 242-5. The embodiments are not limited in this context.

The logic 240 may comprise a credential manager component 242-1. The credential manager component 242-1 may be generally arranged to manage one or more security credentials 252 for the wireless device 102, a user of the wireless device 102, a service provider to provide services to the wireless device 102, or other security credentials. For instance, the credential manager component 242-1 may manage various security credentials 252 necessary to access one or more operator-owned service provider wireless networks, such as wireless networks 104, 106 as shown in FIG. 1. Each service provider wireless network may have different requirements to access services provided by the wireless network, such as different security mechanisms, cost structures, roaming agreements, feature sets, access requirements, authentication requirements, and so forth. The security credentials 252 may represent or comprise all necessary information to access a particular wireless network. Such information may include without limitation information such as service provider information, user information, user account information, device information, network information, home service provider information, roaming service provider information, and other similar types of information needed to access and utilize the wireless networks 104, 106.

In general, each set of security credentials 252 may be used to access a corresponding single wireless network. In some cases, a single set of security credentials 252 may be used to access multiple wireless networks. This may occur when the multiple wireless networks are owned by a single service provider (e.g., Verizon, AT&T, Sprint, etc.). This may also occur when multiple service providers have contractual agreements in place to provide services to each other's customers and/or devices (e.g., roaming agreements, bandwidth resell agreements, competitive local exchange carrier (CLEC) agreements, etc.). In other cases, multiple sets of security credentials 252 may be needed to access a single wireless network. For instance, a single wireless network may need device-related security credentials and user-related security credentials. Finally, multiple sets of security credentials 252 may be needed to access multiple wireless networks.

The logic 240 may comprise a radio interface component 242-2. The radio interface component 242-2 may comprise a control interface for the radio 270. The radio interface component 242-2 may be generally arranged to communicate control directives and/or control signals with the radio 270. For instance, the radio interface component 242-2 may provision the radio 270 with the security credentials 252 managed by the credential manager component 242-1 in order to detect and access the wireless networks 104, 106. The radio interface component 242-2 may also receive network status signals 260 from the radio 270 indicating presence and/or accessibility of one or more networks, such as wireless networks 104, 106 as shown in FIG. 1.

The logic 240 may comprise a power interface component 242-3. The power interface component 242-3 may comprise a control interface for the power manager 210. The power interface component 242-3 may be generally arranged to communicate control directives and/or control signals with the power manager 210. For instance, the power interface component 242-3 may analyze and interpret the network status signals 260 received from the radio 270, and send various power management signals to the power manager 210. The power manager 210 may control or modify an amount of power provided by the power source 212 to one or more parts of the wireless device 102, such as the processor circuit 230, for example.

In various embodiments, each of the interface components 242-2, 242-3 may employ any of a wide variety of signaling technologies enabling computing devices to be coupled to other devices as has been described. Each of these interfaces may include circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3), IEEE-1394, and so forth. The embodiments are not limited in this context.

The wireless device 102 may comprise a memory unit 250 coupled to the processor circuit 230. The memory unit 250 may be generally arranged to store information for the wireless device 102, such as one or more security credentials 252, for example. In various embodiments, the memory unit 250 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller). The embodiments are not limited in this context.

The wireless device 102 may comprise a radio 270 coupled to the processor circuit 230. The radio 270 may comprise a radio-frequency (RF) transceiver generally arranged to send and receive electromagnetic signals with encoded information over one or more antennas. In various embodiments, the radio 270 may employ any of a wide variety of signaling technologies enabling computing devices to wirelessly communicate with other devices. Where the use of wireless signal transmission is entailed, these interfaces may employ signaling and/or protocols conforming to any of a variety of industry standards, including without limitation: one or more Wi-Fi Standards; the IEEE 802.11u Standard; Hotspot 2.0 Standard; IEEE 802.11a, 802.11b, 802.11g, 802.11n, 802.11-2012, 802.11ac, 802.11ad, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 3G and 4G long-term evolution (LTE) and LTE-Advanced (LTE-A), and so forth. The embodiments are not limited in this context.

In one embodiment, the radio 270 may be arranged to communicate with an access point (e.g., AP 110-118) of a wireless network (e.g., 104, 106) in accordance with the Hotspot 2.0 Standard and the IEEE 802.11u Standard. The Hotspot 2.0 Standard and IEEE 802.11u Standards are merely examples, and other communications standards may be implemented as well. The embodiments are not limited in this context.

As with the processor circuit 230, the radio 270 may comprise one or more components 272-b. As shown in FIG. 2, the radio 270 may include a network access component 272-1 and a power interface component 272-2. The radio 270 may implement other components 272-b as desired for a given implementation.

The network access component 272-1 may facilitate network discovery and association as detailed below. In brief, the memory unit 250 may store security credential 252. The security credentials 252 may comprise one or more identifiers that identify a respective one or more home service providers for the wireless device 102. The network access component 272-1 may schedule for wireless transmission a user identifier message that includes a list of the one or more identifiers, and may receive in return one or more response messages that indicate whether network access is permitted via a responding access point or hotspot. For example an access point (hotspot) may respond that network access is permitted and may include a supported provider list that identifies one or more providers that provide access via the hotspot. Such supported provider lists may be sent wirelessly from one or more access points that receive the user identifier message. The network access component 272-1 may then select a provider from a supported provider list of the one or more supported provider lists, where the selected provider corresponding to an identifier of the one or more identifiers that was sent by the wireless device 102. The network access component 272-1 may then schedule association with an access point that provides the selected provider.

The power interface component 272-2 of the radio 270 may operate in a same or similar manner as the power interface component 242-3 executed by the processor circuit 230. For instance, the power interface component 272-2 may comprise a control interface for the power manager 210. The power interface component 272-2 may be generally arranged to communicate control directives and/or control signals with the power manager 210. The power interface component 272-2 may send power management signals to the power manager 210 in response to various network status signals 260. The power manager 210 may control or modify an amount of power provided by the power source 212 for one or more parts of the wireless device 102, such as the processor circuit 230, for example. The power interface component 272-2 may control the power manager 210 when the processor circuit 230 is in a lower power state disabling operations of the power interface component 242-3. For instance, when the processor circuit 230 is in a lower power state, and the radio 270 detects an accessible wireless network 104, 106, the power interface component 272-2 may instruct the power manager 210 to provide more power to the processor circuit 230 in order to switch the processor circuit 230 to a higher power state.

Figure 3:
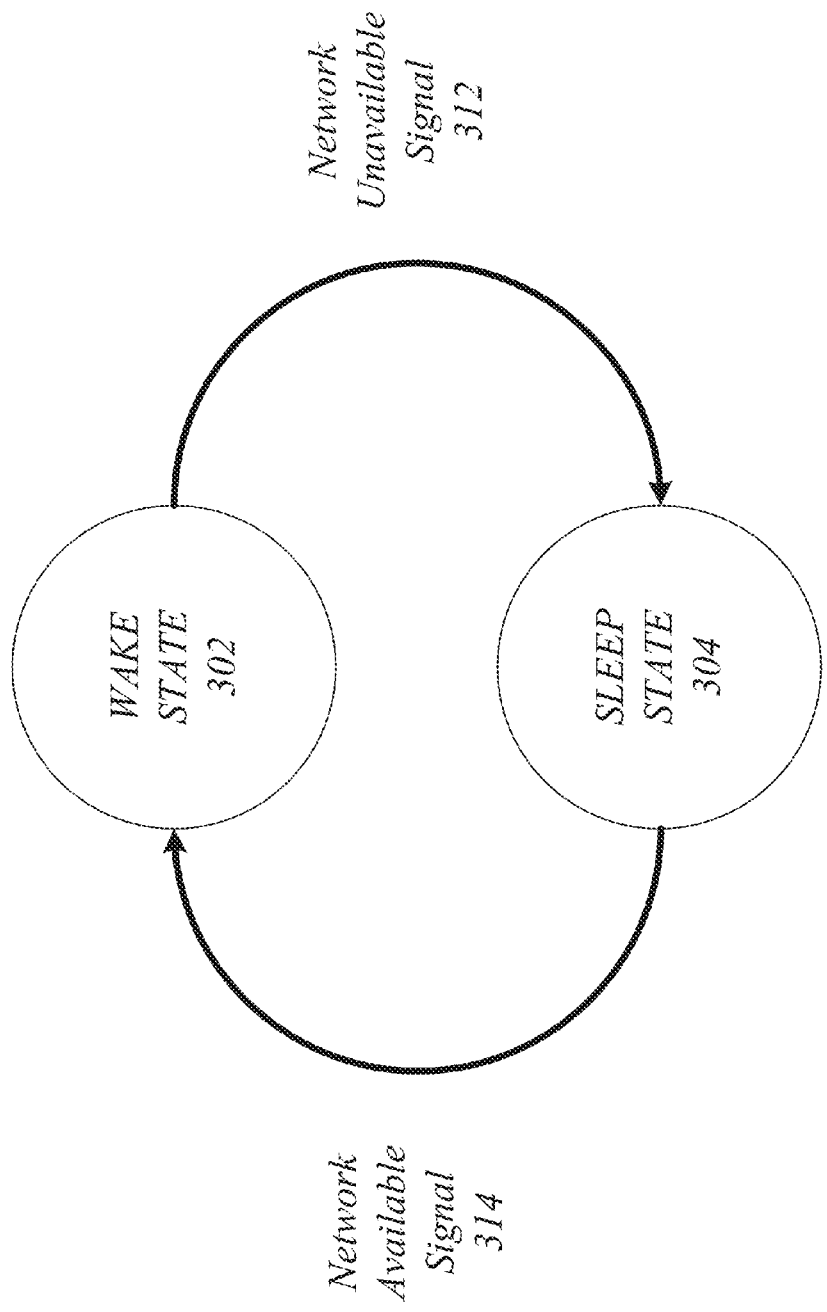
FIG. 3 illustrates an embodiment of power states for a wireless device.

FIG. 3 illustrates exemplary power states 300 for a wireless device 102. As previously described, the power manager 210 may manage two or more power states 300 of the wireless device 102 based on control directives received from the power interface component 242-3 of the logic 240 and/or the power interface component 272-2 of the radio 270.

As shown in FIG. 3, the power states 300 may comprise a wake state 302 and a sleep state 304. In this example, the wake state 302 is a higher power state relative to the sleep state 304, where the processor circuit 230 is active and capable of executing the logic 240. Conversely, the sleep state 304 is a lower power state relative to the wake state 302, where the processor circuit 230 is inactive and incapable of executing the logic 240. With respect to the ACPI standard, for example, the wake state 302 may comprise any of the power states G0, S0, D0, C0 or P0. The sleep state 304 may comprise any of the power states G1-G3, S1-S4, D1-D3, C1-C3 or P1-$P_n$. Embodiments are not limited to these examples.

In various embodiments, the processor circuit 230 of the wireless device 102 may be switched between the wake state 302 and the sleep state 304 in response to various network status signals 260. For instance, the power manager 210 may switch the processor circuit 230 from the wake state 302 to the sleep state 304 in response to a network unavailable signal 312. The network unavailable signal 312 may indicate that a network 104, 106 is currently unavailable or inaccessible by the wireless device 102. Conversely, the power manager 210 may switch the processor circuit 230 from the sleep state 304 to the wake state 302 in response to a network available signal 314. The network available signal 314 may indicate that a network 104, 106 is currently available or accessible by the wireless device 102.

In general operation, the radio 270 may execute the network access component 272-1 to automatically determine whether the wireless device 102 can access a wireless network 104, 106 based on security credentials 252 of the wireless device 102.

The network access component 272-1 may send a query message from the wireless device 102 to an access point 110-118 for a wireless network 104, 106 over a wireless connection, the query message to include a service provider name for which the wireless device 102 has security credentials 252. In one embodiment, the query message may comprise an access network query protocol (ANQP) network access identifier (NAI) home realm query message with a first field to indicate a number of NAI home realm names for which the mobile device has security credentials, and a second field to indicate the NIA home realm name for which the mobile device has security credentials.

The network access component 272-1 may receive a query response message from the access point 110-118 over the wireless connection, the query response message to include a service provider list with a service provider name for which the access point 110-118 provides access. In one embodiment, the query response message may comprise an ANQP NAI home realm response message, the service provider list to comprise a NAI realm list, and the service provider name to comprise a NAI home realm name.

The network access component 272-1 may compare the information contained in the query message with the information contained in the query response message, and automatically determine accessibility based on results of the comparison.

Once the network access component 272-1 determines whether or not the wireless device 102 can access a wireless network 104 or 106, the network access component 272-1 may generate an appropriate network status signal 260. The network access component 272-1 may generate a network status signal 260 as a network available signal 314 when a service provider name for the wireless device 102 matches a service provider name for the access point 110-118. The network access component 272-1 may generate a network status signal 260 as a network unavailable signal 312 when the service provider name for the wireless device 102 does not match the service provider name for the access point 110-118.

The power interface component 242-3 of the logic 240 and/or the power interface component 272-2 of the radio 270 may send control directives to manage various power states 302, 304 of the wireless device 102 based on the network status signals 260. The power interface component 242-3 or 272-2 may send a first control directive to modify a power state 300 for the wireless device 102 from a sleep state 304 to a wake state 302 in response to the network available signal 314. The power interface component 242-3 or 272-2 may send a second control directive to modify a power state 300 for the wireless device 102 from a wake state 302 to a sleep state 304 in response to the network unavailable signal 312.

The power manager 210 may control a power state 300 of the processor circuit 230 in response to the control directives from the power interface components 242-3, 272-2 by regulating an amount of power provided by the power source 212 to the processor circuit 230.

Additional details regarding network access operations are described in more detail with reference to FIGS. 4-9. Additional details regarding power management operations are described in more detail with reference to FIGS. 10-11.

Figure 4:
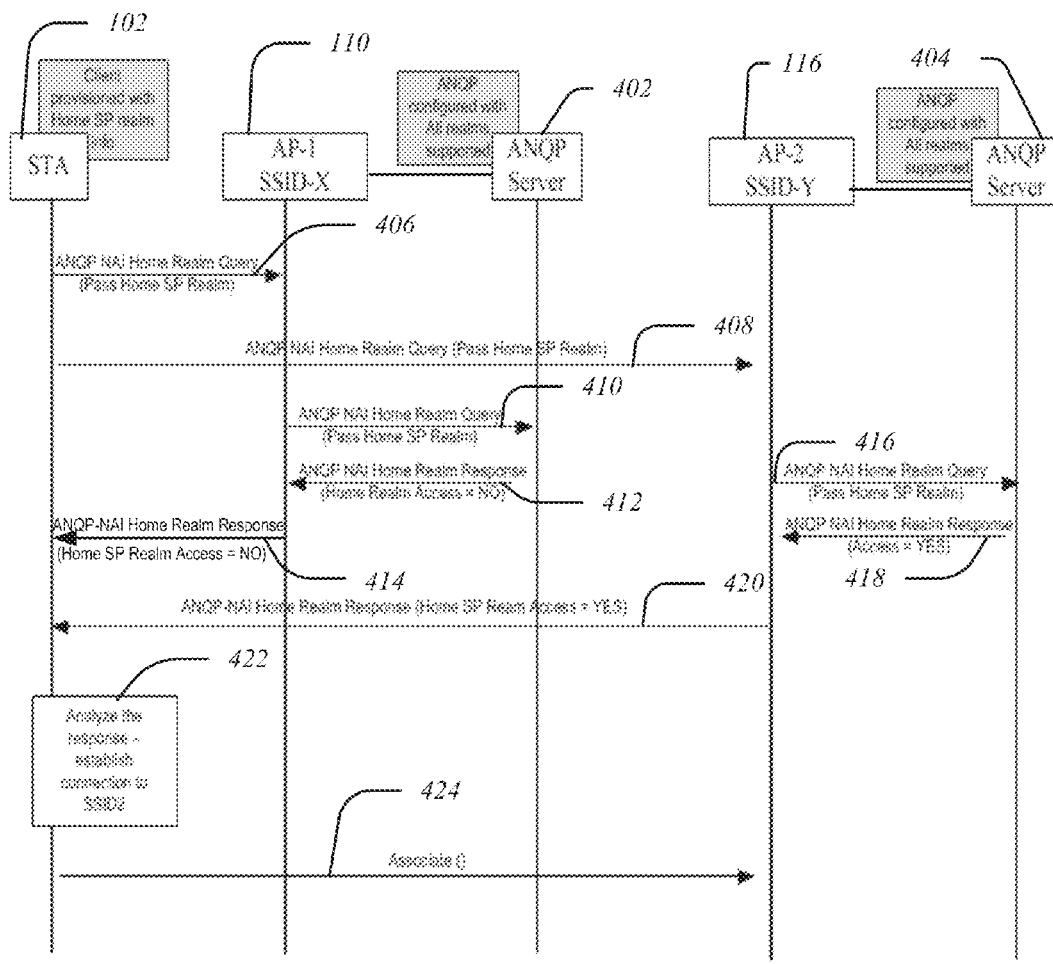
FIG. 4 illustrates an embodiment of a first set of message flows.

FIG. 4 illustrates one embodiment of message flow for accessing a hotspot that may be performed by the wireless device 102 in conjunction with one or more networks. In particular, FIG. 4 illustrates an exemplary wireless communications architecture for a user's wireless device (STA) 102 in one scenario in which multiple access points (or hot spots) may be available within wireless communications range to the STA 202. In the example illustrated, the access point AP-1 may constitute the access point 110 of FIG. 2. The AP 110 includes a first SSID labeled SSID-X for the purposes of illustration. The AP 110 is coupled to a first ANQP server 402 which may belong to the network 104 of a first network provider. A second access point labeled AP-2, which may constitute the access point 116 of FIG. 2, includes a second SSID labeled SSID-Y for the purposes of illustration. The AP 116 is coupled to a second ANQP server 404 which may belong to the network 106 of a second network provider.

Figure 5:
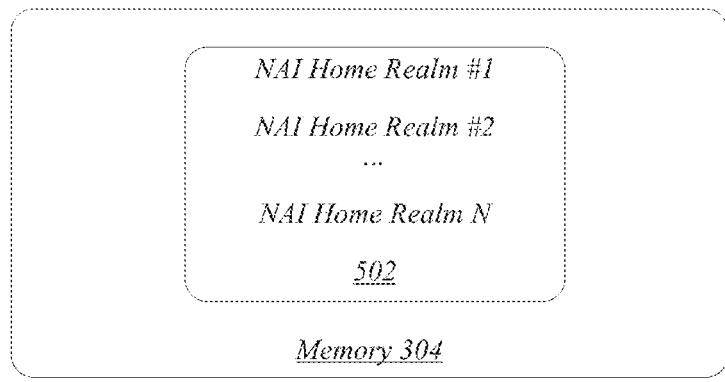
FIG. 5 illustrates an embodiment of a data structure in a wireless device.

In the scenario shown in FIG. 4, the wireless device 102, which may represent any type of client device (e.g., smart phone, tablet computer, notebook computer, etc.), is provisioned with security credentials 252 from one or more home server providers. FIG. 5 illustrates a home realm list 502 that may be stored in the memory 304 in which home service provider information is stored for use in authentication. The home service provider information may include the names of home service provider realms for networks from which the user device 102 has received security credentials 252 to access the given network.

In the architecture of FIG. 4, ANQP servers such as ANQP servers 402, 404 are configured with network information including all the realms in which the given server provides network access, including those of the respective networks 104, 106.

The home service provider information in home realm list 502 facilitates the ability for the wireless device 102 to decide if and whether to use a hotspot based upon information that may be received from an access point (hotspot). In various embodiments, when the wireless device 102 searches for a Wi-Fi connection that it can access using its credential(s) from the home SP, the wireless device 102 sends a set of ANQP NAI Home Realm queries containing the realm(s) of its home SP(s). In the example of FIG. 5, these queries indicate that the wireless device 102 has credentials for home realms that include NAI home realm #1, NAI home realm #2, . . . NAI home realm #N. These queries may then be used for searching if any access point within communications range is connected to a network that allows access to the home SP customers of the NAI home realms sent in the NAI home realm queries. In typical scenarios, a potential access network provider, e.g., wireless networks 104, 106, could be either a home SP network or a network of a roaming partner of a home SP.

Referring to both FIG. 1 and FIG. 4, when the wireless device 102 enters the area A, the wireless device 102 may detect, among others, the access point 110 and the access point 116. Accordingly, the wireless device 102 generates a set of ANQP NAI home realm queries to determine network availability. As shown in FIG. 4, the wireless device 102 sends an ANQP network access identifier home realm query 406 to the access point having the SSID-X, which is AP 110 in this example. As further shown in FIG. 4, the wireless device 102 also sends an ANQP network access identifier home realm query 408 to the access point having the SSID-Y, that is, AP 116 in this example.

Upon receipt of each respective ANQP NAI home realm query message, the respective receiving AP may forward the respective ANQP NAI home realm query message to an ANQP server as shown in FIG. 4. As a first example, the ANQP network access identifier home realm query 406 is forwarded by the access point 110 to ANQP server 402 as an ANQP network access identifier home realm query 410. The ANQP server 402 then examines the ANQP network access identifier home realm query 410 to determine the realms listed therein. In the scenario of FIG. 4, the ANQP server 402 examines a list of realms that are provided in the ANQP NAI home realm query 410, that is, the home realm list 502, which realms correspond to service providers for the wireless device 102 that provide credentials to access services.

Figure 6:
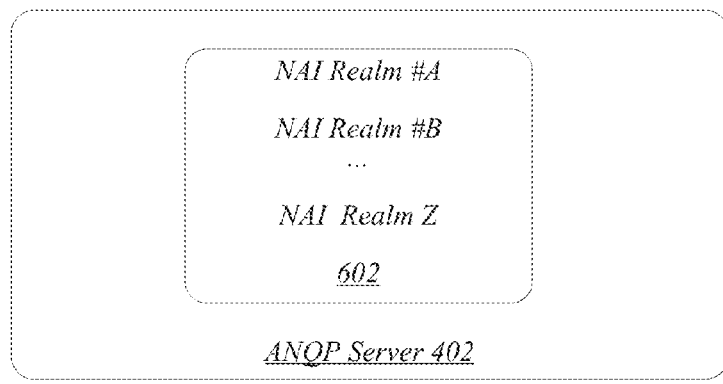
FIG. 6 illustrates an embodiment of a data structure in a network server.

The ANQP server 402 may then check its own memory to examine a realm list that contains a listing of realms for which the ANQP server 402 provides network access. FIG. 6 provides an example of a realm list 602 that may be contained by the ANQP server 402. As shown, the realm list 602 includes NAI realm #A, NAI realm #B, . . . NAI realm #Z, which represent different realms that are supported by the ANQP server 402. In comparing the realm list 602 to the home realm list 502 sent by the wireless device 102 in the ANQP NAI home realm query 410, the ANQP 402 server may determine that there are no matches between lists. In other words, none of the realms supported by the ANQP server 402 (NAI home realm #A, NAI home realm #B, . . .

NAI home realm #Z) correspond to realms listed in the ANQP NAI home realm query 410. After making this determination, the ANQP server 402 returns an ANQP NAI home realm response 412 to the access point 110, which indicates that the ANQP server 402 does not support network access for the wireless device 102 based upon the ANQP NAI home realm query 410. Accordingly, the ANQP NAI home realm response 412 indicates "home realm access=NO" as shown in FIG. 4. The access point 110 forwards this response as an ANQP NAI home realm response 414 to wireless device 102, which indicates to the wireless device 102 "home realm access=NO" as shown in FIG. 4. This informs the wireless device 102 that the ANQP server 402 does not support network access for the wireless device 102 based upon the ANQP NAI home realm query 410.

In a further example, the ANQP network access identifier home realm query 408 is forwarded by the access point 116 to ANQP server 404 as the ANQP network access identifier home realm query 416. The ANQP server 402 then examines the ANQP network access identifier home realm query 416 to determine the realms listed therein. In the scenario of FIG. 4, the ANQP server 404 examines a list of realms that are provided in the ANQP NAI home realm query 416, that is, the home realm list 502, which realms correspond to service providers for the wireless device 102 that provide credentials to access services.

Figure 7:
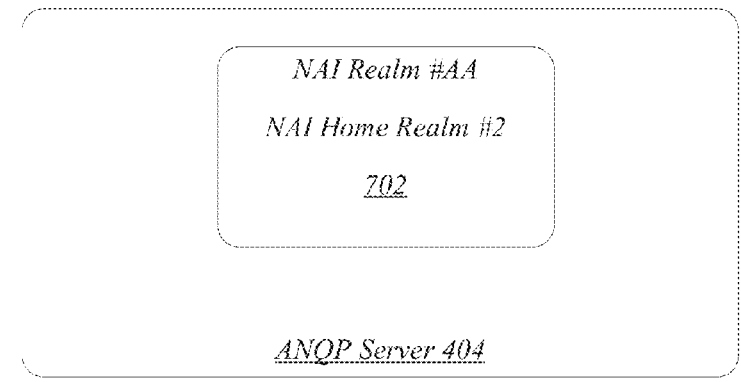
FIG. 7 illustrates an embodiment a further data structure in another network server.

The ANQP server 404 may then check its own memory to examine a realm list that contains a listing of realms for which the ANQP server 404 provides network access. FIG. 7 provides an example of a realm list 702 that may be contained by the ANQP server 404. As shown, the realm list 702 includes NAI home realm #AA and NAI home realm #2, which represent different realms that are supported by the ANQP server 404. In comparing the realm list 702 to the home realm list 502 sent by the wireless device 102 in the ANQP NAI home realm query 416, the ANQP 404 server may determine that there is a match between lists. In other words, the home realm list 502 includes an entry NAI home realm #2, which matches a similar entry in realm list 702. The home realm #2 may correspond to network 106 or another network supported by the ANQP server in different instances. After making this determination, the ANQP server 404 returns an ANQP NAI home realm response 418 to the access point 116, which indicates that the ANQP server 404 does support network access for the wireless device 102 based upon the ANQP NAI home realm query 410. Accordingly, the ANQP NAI home realm response 418 indicates "home realm access=YES" as also shown in FIG. 4.

The access point 116 forwards this response as an ANQP NAI home realm response 420 to wireless device 102, which indicates to the wireless device 102 "home realm access=YES" as shown in FIG. 4. This informs the wireless device 102 that the ANQP server 402 does support network access for the wireless device 102 based upon the ANQP NAI home realm query 416. The ANQP NAI home realm response 420 may additionally provide a supported provider list that identifies the supported provider, that is, NAI home realm #2.

After receiving the ANQP NAI home realm response 414 and ANQP NAI home realm response 420, the wireless device 102, and in particular, the network access component 308, may perform an analysis 422 to determine that the access point 116, identified by the SSID-Y, does provide network access, while the access point 110 does not provide network access. The wireless device 102 may further determine that no other hotspots (AP) within communications range currently provide network access. Accordingly, the wireless device 102 may send an association message 424 to the access point 116 to link to the network denoted by home realm #2. Subsequently, network access is automatically provided to wireless device 102 via access point 116 without requiring user intervention.

The present embodiments as outlined in FIG. 4 thus provide an updating for the ANQP protocol established for IEEE 802.11 communications. In one embodiment, for example, the IEEE 802.11u Standard defines Generic Advertisement Service (GAS) and Access Network Query Protocol (ANQP) by which pre-associated frames can be exchanged using query and response mechanism which allows discovery of access network information. The Hotspot 2.0 Standard extends the IEEE 802.11u ANQP messages and in particular, by use of the "NAI Home Realm Query" process that has been included in the Hotspot 2.0 ANQP queries. As noted, in one implementation of the present embodiments, "NAI Home Realm Query" nonnative text and structures have been submitted and adopted for inclusion in section 4.6 of the Hotspot 2.0 release 2 specification, which is excerpted below.

In particular, section 4.6 provides examples of the content of an ANQP home realm query including the data structure that contains identifiers of home service providers of a requesting wireless device.

4.6 NAI Home Realm Query

The NAI Home Realm Query element is used by a requesting mobile device to determine if the network access identifier (NAI) realms for which it has security credentials are realms corresponding to SPs or other entities whose networks or services are accessible via this BSS.

The requesting mobile device includes in an NAI Home Realm Query only the NAI Home Realm Name(s) for which it has credentials.

In response to the NAI Home Realm Query, a responding AP returns a NAI Realm List formatted as specified in section 8.4.4.10 of the Hotspot 2.0 release 2 specification. The NAI Realm List includes only realms exactly matching realms contained in the NAI Home Realm Query. The NAI Realm List can contain one or more NAI Realm Data fields (see FIG. 8-417 of the Hotspot 2.0 release 2 specification) having one or more matching realms contained within the NAI Realm Data field (see FIG. 8-418 of the Hotspot 2.0 release 2 specification). If the responding AP has no matching NAI Realm subfields, then the NAI Realm List is returned with the NAI Realm Count set to zero. It is worthy to note that the wireless device 102 can include the NAI Home Realm Query as the sole ANQP element in a GAS Initial Request frame.

Figure 13:
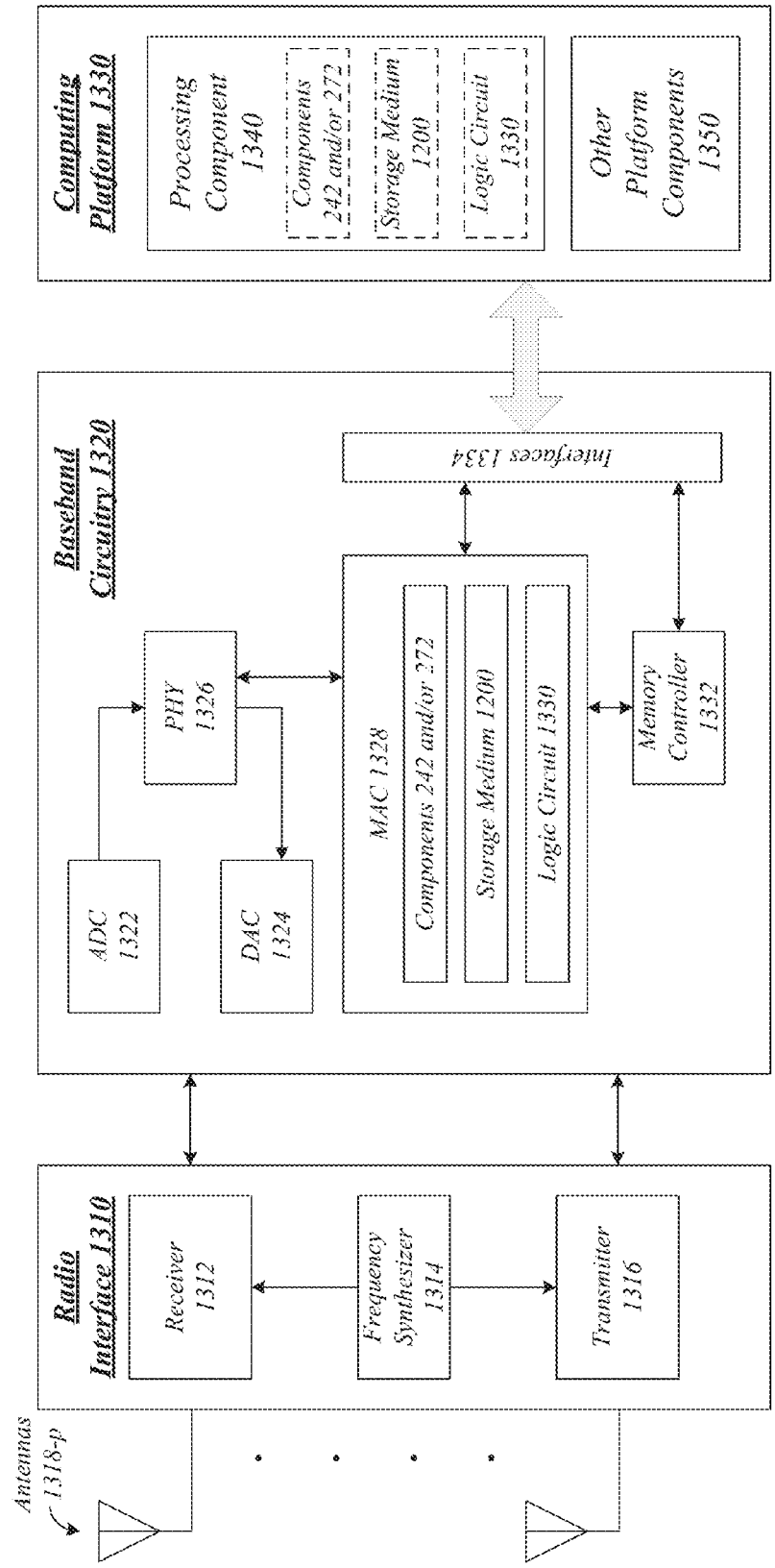
FIG. 13 illustrates an embodiment of a system architecture.

The format of the NAI Home Realm Query Payload is provided in FIG. 13 (Table I).

TABLE I

NAI Home Realm Query element payload

|  | NAI-Home Realm Count | NAI Home Realm Name Data #1 | NAI-Home Realm Name Data #2 (optional) | NAI-Home Realm Name Data #n (optional) |
|---|---|---|---|---|
| Octets: | 1 | variable | variable | variable |

The NAI Home Realm Count is a 1-octet field that specifies the number of NAI Home Realm Name Data fields included in the NAI Home Realm Query. The format of the NAI Home Realm Name Data is shown in FIG. 14 (Table II).

TABLE II

NAI Home Realm Name Data format

|  | NAI Realm Encoding | NAI Home Realm Name Length | NAI Home Realm Name |
| --- | --- | --- | --- |
| Octets: | 1 | 1 | Variable |

Figure 8:
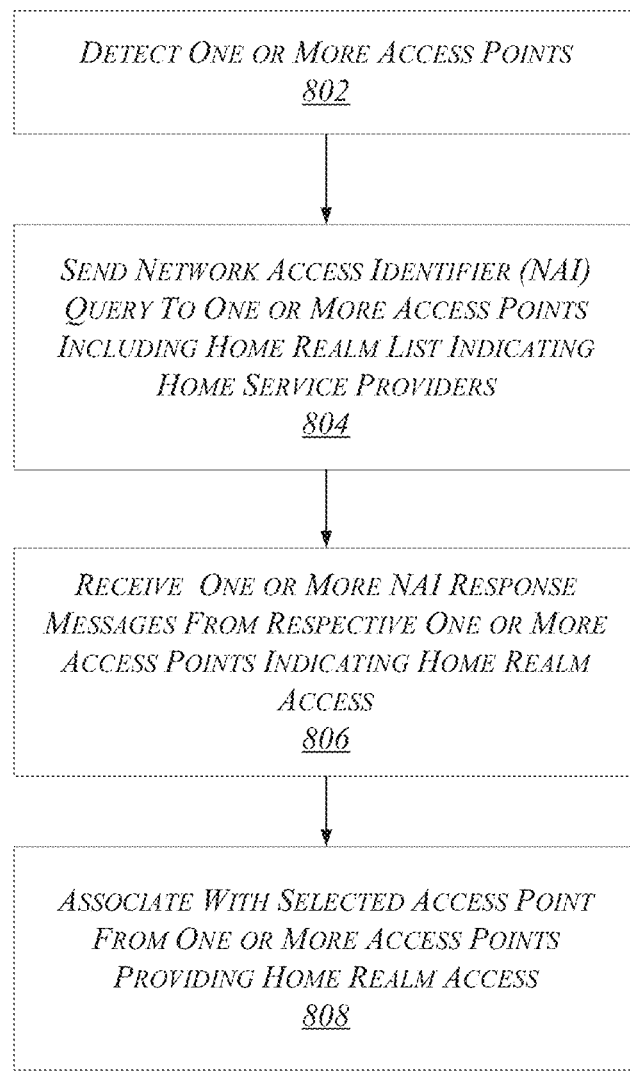
FIG. 8 illustrates an embodiment of a first logic flow.

The NAI Realm Encoding is a 1-octet sub-field whose format is defined in FIGS. 8-419 of the HotSpot 2.0 release 2 specification and described in section 8.4.4.10 of the HotSpot 2.0 release 2 specification.

NAI Home Realm Name Length sub-field is a 1-octet sub-field whose value is the length of the NAI Realm Name sub-field.

The NAI Home Realm Name sub-field is one or more NAI Home Realms formatted as defined in the NAI Realm subfield of the NAI Realm Data field as described in section 8.4.4.10 of the HotSpot 2.0 release 2 specification. The maximum length of this sub-field is 255 octets.

It is to be noted that in some scenarios of the present embodiments, in response to an ANQP home realm query multiple realms may be identified by responding access points that permit access to a user device, such as wireless device 102. For example, a first access point may return a first ANQP home realm response that identifies two different realms, while a second access point returns a second ANQP home realm response that identifies a third realm, each or which realms permits access to the wireless device 102. In such cases, the wireless device 102, and in particular access component 308, may perform selection of a realm based upon policy that is pre-established for the wireless device, such as by a home service provider of the wireless device.

As an alternative to the wireless sending an ANQP home realm query with a NAI Home Realm Name, embodiments may send a modified ANQP home realm query without a NAI Home Realm Name. Rather, the ANQP home realm may simply request a supported provider list from a given access point 110-118. In this case, an ANQP NAI home realm response 420 may provide a supported provider list that identifies all of the providers supported by the access point 110-118.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 8 depicts an exemplary first logic flow 800. The logic flow 800 may be implemented, for example, by a network access component 308 of wireless device. At block 802, one or more access points are detected. At block 804, a network access identifier query that includes a home realm list indicating home service providers for a wireless device is sent to one or more access points. At block 806, one or more NAI response messages is received from a respective one or more access points, where a response message indicates whether home realm access is provided by that access point. At the block 808, association is performed with a selected access point from the one or more access points that provides home realm access.

Figure 9:
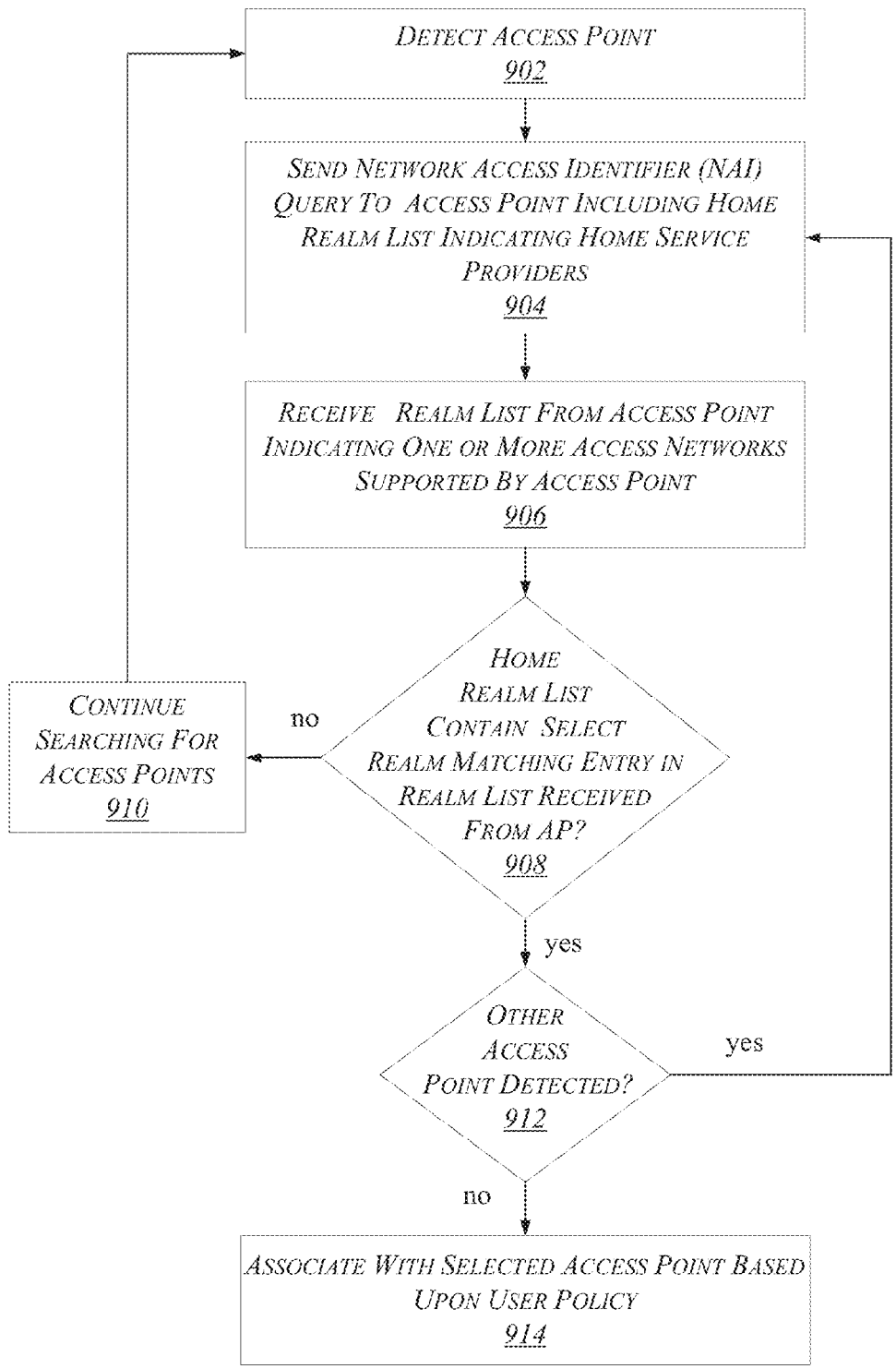
FIG. 9 illustrates an embodiment of a second logic flow.

FIG. 9 depicts an exemplary second logic flow 900. At block 902, an access point is detected. At block 904, a network access identifier query is sent to the detected access point including a home realm list that indicates home service providers for a wireless device. At block 906, a realm list is received from the detected access point which identifies one or more supported providers, that is, access networks supported by the access point.

At decision block 908 a determination is made as to whether the home realm list sent contains a select realm or realms that matches an entry or entries in the realm list received from the detected access point. If not, the flow proceeds to block 910 where searching for access points is continued. After block 910, the flow returns to block 902.

If, at decision block 908 a match or matches is determined, the flow proceeds to block 912. At decision block 912, a determination is made as to whether additional access points have been detected. If so, the flow proceeds to block 904 where a network access identifier query is sent to the additional detected access point including a home realm list that indicates home service providers for a wireless device. If not, the flow proceeds to block 914 where association is performed with a selected access point based upon user policy.

FIG. 10 depicts an exemplary third logic flow 1000. The logic flow 1000 may be implemented, for example, by the network access component 272-1 of the radio 270 of the wireless device 102.

At block 1002, the network access component 272-1 may send an access network query protocol (ANQP) network access identifier (NAI) home realm query message to an access point 110-118 for a wireless network 104, 106 over a wireless connection. The ANQP NAI home realm query message may include a NAI home realm name for which the wireless device 102 has security credentials 252. For instance, the ANQP NAI home realm query message may specify a number of NAI home realm names for which the wireless device 102 has security credentials 252 in a first field of the ANQP NAI home realm query message. The ANQP NAI home realm query message may further specify the NIA home realm name for which the wireless device 102 has security credentials 252 in a second field of the ANQP NAI home realm query message.

At block 1004, the network access component 272-1 may receive an ANQP NAI home realm response from the access point 110-118 over the wireless connection. The ANQP NAI home realm response may include a realm list with a NAI home realm name for which the access point 104, 106 provides access.

At block 1006, the network access component 272-1 may determine whether the NAI home realm name for the mobile device matches the NAI home realm name for the access point. The network access component 272-1 may generate various network status signals 260 based on matching (or non-matching) NAI home realm names, which in turn may be interpreted by one of the power interface components 242-3, 272-2 to issue control directives to the power manager 210 to perform power management operations for the wireless device 102. For instance, the power interface components 242-3, 272-2 may send a first control directive to modify a power state 300 for the wireless device 102 from the sleep state 304 to the wake state 302 in response to a network available signal 314. Conversely, the power interface components 242-3, 272-2 may send a second control directive to modify a power state 300 for the wireless device 102 from the wake state 302 to the sleep state 304 in response to the network unavailable signal 312.

Figure 11:
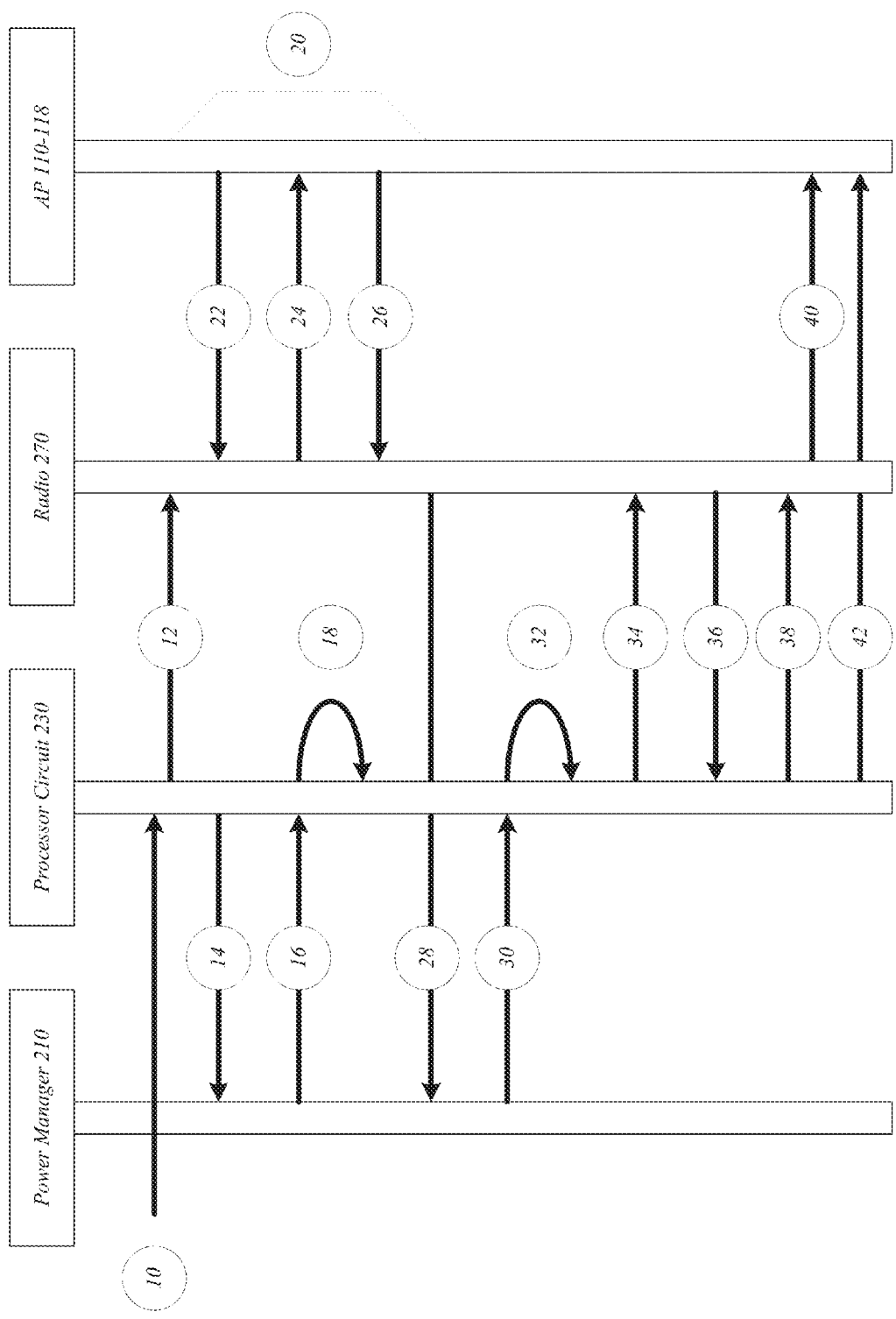
FIG. 11 illustrates an embodiment of a second set of message flows.

FIG. 11 illustrates one embodiment of message flow 1100 for managing power states of the wireless device 102 in response to accessibility of one or more networks 104, 106. In particular, FIG. 11 illustrates an exemplary wireless communications architecture for the wireless device 102 in one scenario in which one or more access points 110-118 (or hot spots) may be available within wireless communications range to the STA 202.

In the example illustrated, a user and/or operator may configure security credentials 252 for a particular service provider needed by the wireless device 102 to access a wireless network at circle 10. The user and/or operator may store the security credentials 252 into the memory unit 250 of the processor circuit 230 via the credential manager component 242-1.

The radio interface component 242-2 of the processor circuit 230 may provision the network access component 272-1 of the radio 270 with the security credentials 252 at circle 12. The power interface component 242-3 of the processor circuit 230 may notify the power manager 210 that it is ready to enter a sleep state 304 at circle 14. The power manager 210 may switch the processor circuit 230 into a sleep state 304 by reducing power provided to the processor circuit 230 by the power source 212 at circle 16. The processor circuit 230 may enter the sleep state 304 to conserve battery power at circle 18.

While the processor circuit 230 is in the sleep state 304, the network access component 272-1 of the radio 270 may perform periodic discovery of a wireless network 104, 106 via an access point 110-118 at circle 20. For instance, when the wireless device 102 is within communications range of an access point 110-118, the radio 270 may receive a beacon signal from the access point 110-118 at circle 22. The network access component 272-1 may send an ANQP NAI home realm query message to an access point 110-118 for a wireless network 104, 106 over a wireless connection at circle 24. The network access component 272-1 may receive an ANQP NAI home realm response from the access point 110-118 over the wireless connection at circle 26. The ANQP NAI home realm response may include a realm list with a NAI home realm name for which the access point 104, 106 provides access.

The network access component 272-1 may compare the NAI home realm name for the wireless device 102 (or user of the wireless device 102) with the NAI home realm name for the access point 110-118 to determine whether there is a match. The network access component 272-1 may send a network available signal 314 to the power interface component 272-2 when the NAI home realm name for the wireless device 102 (or user of the wireless device 102) matches the NAI home realm name for the access point 110-118.

The power interface component 272-2 may send various control directives to the power manager 210 in response to the different network status signals 260. For instance, the power interface component 272-2 may send a wakeup signal to the power manager 210 in response to the network available signal 314 at circle 28. The power manager 210 may switch the processor circuit 230 from the sleep state 304 to the wake state 302 by increasing an amount of power from the power source 212 provided to the processor circuit 230 at circle 30. The processor circuit 230 may enter the wake state 302 at circle 32.

Once the processor circuit 230 is awake, the radio interface component 242-2 may send a wakeup query signal from the processor circuit 230 to the radio 270 to request a reason why the processor circuit 230 for the mobile device is in the wake state 302 at circle 34. The network access component 272-1 may send a wakeup query response signal to the radio interface component 242-2 of the processor circuit 230 with a reason the processor circuit 230 was switched to the wake state 302 at circle 36. Assuming the reason is valid, such as a network 104, 106 is available and accessible via the security credentials 252 of the wireless device 102, the radio interface component 242-2 may instruct the network access component 272-1 to associate the wireless device 102 and the access point 110-118 when the wireless device 102 is in the wake state 302 at circle 40. Once associated, the radio interface component 242-2 may authenticate a user of the wireless device 102 with the access point 110-118 with the security credentials 252 or additional authentication information (e.g., personal identification number, explicit commands from a user, biometric information, etc.) to begin communications at circle 42.

In some cases, the realm list may include multiple NAI home realm names. In such cases, the radio interface component 242-2 may select a NAI home realm name from the realm list, and instruct the network access component 272-1 to send an association message with the selected NAI home realm name from the wireless device 102 to the access point 110-118.

As the presence of an accessible network 104, 106 may be used as a trigger to switch the wireless device 102 from a sleep state 304 to a wake state 302, the reverse may occur as well. The absence of an accessible network 104, 106 may be used a trigger to switch the wireless device 102 from a wake state 302 to a sleep state 304. For instance, once the wireless device 102 associates with an access point 110-118, and the processor circuit 230 is in the wake state 302, the discovery process at circle 20 may result in the network access component 272-1 ascertaining that the wireless device 102 can no longer access a wireless network 104, 106. This may occur because the wireless device 102 may have moved beyond communications range of the access point 110-118. In another example, assume the wireless device 102 is in a wake state 302 for a defined period of time without finding an accessible network 104, 106 and where the NAI home realm name for the wireless device 102 (or user of the wireless device 102) does not match the NAI home realm name for the access point 110-118. In such cases, the network access component 272-1 may send a network unavailable signal 312 to the power interface component 242-3 of the processor circuit 230.

The power interface component 242-3 may send various control directives to the power manager 210 in response to the different network status signals 260. For instance, the power interface component 272-2 may send a sleep signal to the power manager 210 in response to the network unavailable signal 312. The power manager 210 may switch the processor circuit 230 from the wake state 302 to the sleep state 304 by decreasing an amount of power from the power source 212 provided to the processor circuit 230. The processor circuit 230 may remain in the sleep state 304 until a suitable network 104, 106 is discovered by the radio 270.

In summary, the present embodiments provide the following benefits for accessing wireless networks. To begin with, the techniques of the present embodiments employ only simple an ANQP NAI Home Realm query/response message exchange that can be performed very rapidly. This also simplifies NAI Home Realm roaming identification significantly. In addition, the techniques of the present embodiments remove the dependency on existing SSID-based network discovery and selection which existing procedures are static, only allow home SP home network identification, are not easily scalable well for large scale scenarios, and do not provide any information about a roaming partners of a home SP. Another advantage afforded by the present embodiments is that hard coding of SSID on a device is not required. The present embodiments also provide for the wireless device to identify both home SP network and also roaming partners' networks. A further advantage is that wireless devices can quickly and reliably discover a network the wireless device can have access to, which may help power saving by minimizing the discovery time. This also reduces overhead by transmitting minimal and only essential information over the air. Finally, the present embodiments facilitate automatic wireless network discovery and selection, thereby eliminating the need for a user to manually intervene during this process.

Figure 12:
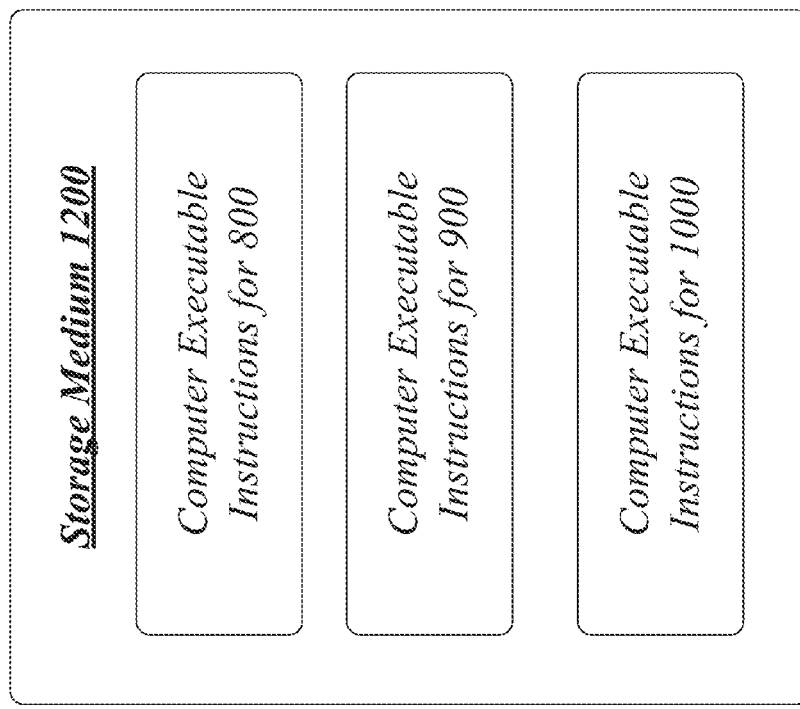
FIG. 12 illustrates an embodiment of an article.

FIG. 12 illustrates an embodiment of a storage medium 1200. The storage medium 1200 may comprise an article of manufacture. In one embodiment, the storage medium 1200 may comprise any non-transitory computer readable medium or machine readable medium, such as an optical, magnetic or semiconductor storage. The storage medium may store various types of computer executable instructions, such as instructions to implement one or more of the logic flows 800, 900 and/or 1000. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The embodiments are not limited in this context.

FIG. 13 illustrates an embodiment of a device 1300 for use in a WLAN system, such as the wireless networks 104, 106. Device 1300 may implement, for example, the wireless device 102, access point 110-118, storage medium 1200 and/or a logic circuit 1330. The logic circuit 1330 may include physical circuits to perform operations described for the wireless device 102 or the access points 110-118. As shown in FIG. 13, device 1300 may include a radio interface 1310, baseband circuitry 1320, and computing platform 1330, although embodiments are not limited to this configuration.

The device 1300 may implement some or all of the structure and/or operations for the wireless device 102, access point 110-118, storage medium 1200 and/or a logic circuit 1330 in a single computing entity, such as entirely within a single device. Alternatively, the device 1300 may distribute portions of the structure and/or operations for the the wireless device 102, access point 110-118, storage medium 1200 and/or a logic circuit 1330 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1310 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1310 may include, for example, a receiver 1312, a transmitter 1316 and/or a frequency synthesizer 1314. Radio interface 1310 may include bias controls, a crystal oscillator and/or one or more antennas 1318-$p$. In another embodiment, radio interface 1310 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1320 may communicate with radio interface 1310 to process receive and/or transmit signals and may include, for example, an analog-to-digital converter 1322 for down converting received signals, a digital-to-analog converter 1324 for up converting signals for transmission. Further, baseband circuitry 1320 may include a baseband or physical layer (PHY) processing circuit 1356 for PHY link layer processing of respective receive/transmit signals. Baseband circuitry 1320 may include, for example, a processing circuit 1328 for medium access control (MAC)/data link layer processing. Baseband circuitry 1320 may include a memory controller 1332 for communicating with processing circuit 1328 and/or a computing platform 1330, for example, via one or more interfaces 1334.

In some embodiments, PHY processing circuit 1326 may include a frame construction and/or detection module, in combination with additional circuitry such as a buffer memory, to construct and/or deconstruct communication frames, such as radio frames 302-$e$. Alternatively or in addition, MAC processing circuit 1328 may share processing for certain of these functions or perform these processes independent of PHY processing circuit 1326. In some embodiments, MAC and PHY processing may be integrated into a single circuit.

The computing platform 1330 may provide computing functionality for the device 1300. As shown, the computing platform 1330 may include a processing component 1340. In addition to, or alternatively of, the baseband circuitry 1320, the device 1300 may execute processing operations or logic for the UE 130, base station 800, storage medium 1000, and logic circuit 1330 using the processing component 1330. The processing component 1330 (and/or PHY 1326 and/or MAC 1328) may comprise various hardware elements, software elements, or a combination of both. Examples of hardware elements may include devices, logic devices, components, processors, microprocessors, circuits, processor circuits (e.g., processor circuits 220, 820), circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1330 may further include other platform components 1350. Other platform components 1350 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1300 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1300 described herein, may be included or omitted in various embodiments of device 1300, as suitably desired. In some embodiments, device 1300 may be configured to be compatible with protocols and frequencies associated one or more of the IEEE 802.11 Standards, Hotspot 2.0 Standards, 3GPP LTE Specifications and/or IEEE 802.16 Standards for WMANs, and/or other broadband wireless networks, cited herein, although the embodiments are not limited in this respect.

Embodiments of device 1300 may be implemented using single input single output (SISO) architectures. However, certain implementations may include multiple antennas (e.g., antennas 1318-$p$) for transmission and/or reception using adaptive antenna techniques for beamforming or spatial division multiple access (SDMA) and/or using MIMO communication techniques.

The components and features of device 1300 may be implemented using any combination of discrete circuitry, application specific integrated circuits (ASICs), logic gates and/or single chip architectures. Further, the features of device 1300 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1300 shown in the block diagram of FIG. 13 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

In a first example, an apparatus may comprise a network access component for execution by circuitry to automatically determine whether a wireless device can access a wireless network based on security credentials of the wireless device, and generate a network status signal when the wireless device can access a wireless network, and a power interface component for execution by circuitry to send control directives to manage various power states of the wireless device based on the network status signal.

In a second example, the apparatus may further comprise a radio-frequency (RF) transceiver coupled to the circuitry, the transceiver to communicate with an access point of a wireless network in accordance with a Hotspot 2.0 Standard and an IEEE 802.11u Standard.

In a third example, the apparatus may further comprise a credential manager component to manage the security credentials for the wireless device.

In a fourth example, the apparatus may further comprise a radio interface component to provision the network access component with the security credentials.

In a fifth example, the apparatus may further comprise a power manager to manage power states of the wireless device based on the control directives received from the power interface component.

In a sixth example, the apparatus may further comprise the network access component to send a query message from the wireless device to an access point for a wireless network over a wireless connection, the query message to include a service provider name for which the wireless device has security credentials.

In a seventh example, the apparatus may further comprise the query message to comprise an access network query protocol (ANQP) network access identifier (NAI) home realm query message with a first field to indicate a number of NAI home realm names for which the wireless device has security credentials, and a second field to indicate the NIA home realm name for which the wireless device has security credentials.

In an eighth example, the apparatus may further comprise the network access component to receive a query response message from the access point over the wireless connection, the query response message to include a service provider list with a service provider name for which the access point provides access.

In a ninth example, the apparatus may further comprise the query response message to comprise an ANQP NAI home realm response message, the service provider list to comprise a NAI realm list, and the service provider name to comprise a NAI home realm name.

In a tenth example, the apparatus may further comprise the network access component to generate the network status signal as a network available signal when a service provider name for the wireless device matches a service provider name for the access point, and a network unavailable signal when the service provider name for the wireless device does not match the service provider name for the access point.

In an eleventh example, the apparatus may further comprise the power interface component to send a first control directive to modify a power state for the wireless device from a sleep state to a wake state in response to the network available signal, and a second control directive to modify a power state for the wireless device from a wake state to a sleep state in response to the network unavailable signal.

In a twelfth example, the apparatus may further comprise the network access component to associate the wireless device and the access point when the wireless device is in the wake state.

In a thirteenth example, the apparatus may further comprise a memory to store the security credentials for the wireless device, a memory controller, a radio, and a touchscreen display.

In a fourteenth example, a method may comprise sending an access network query protocol (ANQP) network access identifier (NAI) home realm query message to a access point for a wireless local area network (wireless network) over a wireless connection, the ANQP NAI home realm query message to include a NAI home realm name for which a wireless device has security credentials. The method may further comprise receiving an ANQP NAI home realm response from the access point over the wireless connection, the ANQP NAI home realm response to include a realm list with a NAI home realm name for which the access point provides access. The method may further comprise determining whether the NAI home realm name for the wireless device matches the NAI home realm name for the access point. The method may further comprise performing power management operations for the wireless device based on matching NAI home realm names.

In a fifteenth example, the method may further comprise specifying a number of NAI home realm names for which the wireless device has security credentials in a first field of the ANQP NAI home realm query message, and specifying the NIA home realm name for which the wireless device has security credentials in a second field of the ANQP NAI home realm query message.

In a sixteenth example, the method may further comprise sending a network available signal to a power interface component when the NAI home realm name for the wireless device matches the NAI home realm name for the access point.

In a seventeenth example, the method may further comprise sending a network unavailable signal to a power interface component when the NAI home realm name for the wireless device does not match the NAI home realm name for the access point.

In an eighteenth example, the method may further comprise sending a wakeup query signal from a processor circuit to a transceiver to request a reason the processor circuit for the wireless device is in the wake state.

In a nineteenth example, the method may further comprise receiving a wakeup query response signal by a processor circuit from a transceiver with a reason the processor circuit for the wireless device is in the wake state.

In a twentieth example, the method may further comprise associating the wireless device and the access point when the wireless device is in the wake state.

In a twenty-first example, the realm list may further include multiple NAI home realm names, and the method may comprise selecting a NAI home realm name from the realm list, and sending an association message with the selected NAI home realm name from the wireless device to the access point.

In a twenty-second example, the method may further comprise authenticating the wireless device and the access point with the security credentials when the wireless device is associated with the access point.

In a twenty-third example, at least one machine-readable storage medium may comprise instructions that when executed by a computing device, cause the computing device to perform the method of any of the previous examples.

In a twenty-fourth example, an apparatus to manage power states for a wireless device may comprise means for performing the method of any of the previous examples.

In a twenty-fifth example, user equipment to perform power management for a wireless device may comprise means for performing the method of any of the previous examples.

In a twenty-sixth example, user equipment may comprise a radio-frequency (RF) transceiver to communicate with an access point of a wireless network, a network access component for execution by circuitry to automatically determine whether a wireless device can access the wireless network based on security credentials of the wireless device, and generate a network status signal when the wireless device can access the wireless network, and a power interface component for execution by circuitry to send control directives to manage various power states of the wireless device based on the network status signal.

In a twenty-seventh example, the user equipment may further comprise the RF transceiver to communicate with the access point of the wireless network in accordance with a Hotspot 2.0 Standard and an IEEE 802.11u Standard.

In a twenty-eighth example, the user equipment may further comprise the network access component to send a query message from the wireless device via the RF transceiver to an access point for the wireless network over a wireless connection, the query message to include a request for a service provider name for which the wireless device has security credentials.

In a twenty-ninth example, the user equipment may further comprise the network access component to send a query message from the wireless device via the RF transceiver to an access point for the wireless network over a wireless connection, the query message to include a service provider name for which the wireless device has security credentials.

In a thirtieth example, the user equipment may further comprise the query message to comprise an access network query protocol (ANQP) network access identifier (NAI) home realm query message with a first field to indicate a number of NAI home realm names for which the wireless device has security credentials, and a second field to indicate the NIA home realm name for which the wireless device has security credentials.

The invention claimed is:

1. An apparatus, comprising:
a network access component for execution by circuitry to:
automatically determine whether a wireless device can access a wireless network based on security credentials of the wireless device,
send a query message from the wireless device to an access point for the wireless network over a wireless connection, the query message to include a first service provider name for which the wireless device has security credentials,
receive a query response message from the access point over the wireless connection, the query response message to include a service provider list with a second service provider name for which the access point provides access, and
generate a network status signal when the wireless device can access the wireless network based first service provider name and the second service provider name; and
a power interface component for execution by circuitry to send control directives to manage various power states of the wireless device based on the network status signal.

2. The apparatus of claim 1, comprising a radio-frequency (RF) transceiver coupled to the circuitry, the RF transceiver to communicate with the access point of the wireless network in accordance with a Hotspot 2.0 Standard and an IEEE 802.11u Standard.

3. The apparatus of claim 1, comprising a credential manager component to manage the security credentials for the wireless device.

4. The apparatus of claim 1, comprising a radio interface component to provision the network access component with the security credentials.

5. The apparatus of claim 1, comprising a power manager to manage power states of the wireless device based on the control directives received from the power interface component.

6. The apparatus of claim 1, the query message to comprise an access network query protocol (ANQP) network access identifier (NAI) home realm query message with a first field to indicate a number of NAI home realm names for which the wireless device has security credentials, and a second field to indicate the first service provider name comprising a NAI home realm name for which the wireless device has security credentials.

7. The apparatus of claim 1, the query response message to comprise an ANQP NAI home realm response message, the service provider list to comprise a NAI realm list, and the second service provider name to comprise a NAI home realm name.

8. The apparatus of claim 1, the network access component to generate the network status signal as a network available signal when the first service provider name for the wireless device matches the second service provider name for the access point, and a network unavailable signal when the first service provider name for the wireless device does not match the second service provider name for the access point.

9. The apparatus of claim 8, the power interface component to send a first control directive to modify a power state for the wireless device from a sleep state to a wake state in response to the network available signal, and a second control directive to modify the power state for the wireless device from the wake state to the sleep state in response to the network unavailable signal.

10. The apparatus of claim 1, the network access component to associate the wireless device and the access point when the wireless device is in a wake state.

11. The apparatus of claim 1, comprising a memory to store the security credentials for the wireless device, a memory controller, a radio, and a touch-screen display.

12. A computer-implemented method, comprising:
sending an access network query protocol (ANQP) network access identifier (NAI) home realm query message to an access point for a wireless local area network (WLAN) over a wireless connection, the ANQP NAI home realm query message to include a first NAI home realm name for which a wireless device has security credentials; receiving an ANQP NAI home realm response from the access point over the wireless connection, the ANQP NAI home realm response to include a realm list with a second NAI home realm name for which the access point provides access;

determining whether the first NAI home realm name for the wireless device matches the second NAI home realm name for the access point;

performing power management operations for the wireless device based on matching NAI home realm names; and sending a network available signal to a power interface component when the NAI home realm name for the wireless device matches the NAI home realm name for the access point.

13. The computer-implemented method of claim 12, comprising:

specifying a number of NAI home realm names for which the wireless device has security credentials in a first field of the ANQP NAI home realm query message; and specifying the first NAI home realm name for which the wireless device has security credentials in a second field of the ANQP NAI home realm query message.

14. The computer-implemented method of claim 12, comprising sending a network unavailable signal to the power interface component when the NAI home realm name for the wireless device does not match the NAI home realm name for the access point.

15. The computer-implemented method of claim 12, comprising sending a wakeup query signal from a processor circuit to a transceiver to request a reason the processor circuit for the wireless device is in a wake state.

16. The computer-implemented method of claim 12, comprising receiving a wakeup query response signal by a processor circuit from a transceiver with a reason the processor circuit for the wireless device is in a wake state.

17. The computer-implemented method of claim 12, comprising associating the wireless device and the access point when the wireless device is in a wake state.

18. At least one non-transitory machine-readable storage medium comprising instructions that when executed by a computing device, cause the computing device to:

send an access network query protocol (ANQP) network access identifier (NAI) home realm query message to an access point for a wireless local area network (WLAN) over a wireless connection, the ANQP NAI home realm query message to include a first NAI home realm name for which a wireless device has security credentials;

receive an ANQP NAI home realm response from the access point over the wireless connection, the ANQP NAI home realm response to include a realm list with a second NAI home realm name for which the access point provides access;

determine whether the first NAI home realm name for the wireless device matches the second NAI home realm name for the access point;

perform power management operations for the wireless device based on matching NAI home realm names, the power management operations to include a control directive to switch circuitry of the wireless device from a sleep state to a wake state when the NAI home realm names match; and send a network available signal to a power interface component when the NAI home realm name for the wireless device matches the NAI home realm name for the access point.

19. The at least one non-transitory machine-readable storage medium of claim 18, comprising instructions that when executed by a computing device cause the computing device to specify a number of NAI home realm names for which the wireless device has security credentials in a first field of the ANQP NAI home realm query message, and specify the first NAI home realm name for which the wireless device has security credentials in a second field of the ANQP NAI home realm query message.

20. The at least one non-transitory machine-readable storage medium of claim 18, comprising instructions that when executed by a computing device cause the computing device to send a network unavailable signal to a power interface component when the NAI home realm name for the wireless device does not match the NAI home realm name for the access point.

21. The at least one non-transitory machine-readable storage medium of claim 18, comprising instructions that when executed by a computing device cause the computing device to associate the wireless device and the access point when the wireless device is in the wake state.

* * * * *